United States Patent
Overgoor et al.

(10) Patent No.: US 8,200,425 B2
(45) Date of Patent: Jun. 12, 2012

(54) ROUTE PREDICTION USING NETWORK HISTORY

(75) Inventors: Frank Overgoor, Zwolle (NL); Andreas Meider, Cologne (DE); Rob Uljee, Dordrecht (NL)

(73) Assignee: SAP AG, Walldorf (DE)

( * ) Notice: Subject to any disclaimer, the term of this patent is extended or adjusted under 35 U.S.C. 154(b) by 660 days.

(21) Appl. No.: 12/347,951

(22) Filed: Dec. 31, 2008

(65) Prior Publication Data
US 2010/0169000 A1    Jul. 1, 2010

(51) Int. Cl.
*G01C 21/34* (2006.01)
*G01C 21/00* (2006.01)
*G06Q 99/00* (2006.01)

(52) U.S. Cl. .......... 701/410; 701/424; 705/330

(58) Field of Classification Search .......... 701/202, 701/204, 410, 434; 705/330
See application file for complete search history.

(56) References Cited

U.S. PATENT DOCUMENTS

| | | | |
|---|---|---|---|
| 6,317,686 B1 * | 11/2001 | Ran | 701/210 |
| 6,711,498 B1 * | 3/2004 | Lau et al. | 701/209 |
| 2002/0049622 A1 * | 4/2002 | Lettich et al. | 705/7 |
| 2005/0075119 A1 * | 4/2005 | Sheha et al. | 455/456.6 |
| 2006/0074791 A1 * | 4/2006 | Jelaco | 705/37 |

* cited by examiner

*Primary Examiner* — Amee A Shah
(74) *Attorney, Agent, or Firm* — Brake Hughes Bellermann LLP

(57) ABSTRACT

A computer system may include a route reader configured to determine routes of a route database, the routes being associated with a combination of route characteristics including an origin, destination, and transported object type, the routes representing actual transportations of transported objects of the transported object type from the origin to the destination within a time period. The computer system also may include a route selector configured to determine a route set from among the routes, based on additional route characteristics, and a route analyzer configured to determine a subset of routes from among the route set, based on a total transit time of each route within the route set, and configured to separate each of the subset of routes into route events of each route, each route event being associated with a route event completion time. The computer system also may include a route predictor configured to determine a predictive event completion time for each route event, based on the associated route event completion time, and further configured to use the predictive event completion time for each route event to compile a predictive route transit time and thereafter provide the predictive route transit time as a prediction for future transporting of transported objects of the transported object type between the origin and the destination.

20 Claims, 4 Drawing Sheets

US 8,200,425 B2

ROUTE PREDICTION USING NETWORK HISTORY

TECHNICAL FIELD

This description relates to forecasting route characteristics when transporting objects.

BACKGROUND

Many businesses and other enterprises are engaged in the transportation of objects from one location to another. Such transportation may occur on many different scales, e.g., ranging from transportation across a city to across the world, and from a few transportations per day to millions per day. The timing of such transportations is often a critical factor, yet it may be difficult to predict the timing with a desired degree of accuracy or reliability.

For example, many shipment companies and postal offices are engaged in the shipment of packages and other mailings. As just referenced, the timing of such shipments is often critical. For example, such companies may guarantee overnight (or some other timeframe, such as two-day or three-day) delivery of a package from an origin to a destination. If such companies are unable to meet these guarantees, then they may experience a loss of present and future revenue.

Conventional systems exist for collecting data regarding deliveries and other transportations of objects. For example, a company in charge of delivering a package may require that the package by tracked during its shipment, e.g., at each transportation leg and at each time the package is loaded, unloaded, sorted, or otherwise handled. Technology such as, e.g., bar code scanners and Radio Frequency Identifiers (RFID) may be used for such tracking. However, in a large delivery network, such tracking may quickly result in a huge database that becomes difficult to use in any practical way for ensuring that timing requirements will be met for future shipments.

SUMMARY

According to one general aspect, a computer system may include a route reader configured to determine routes of a route database, the routes being associated with a combination of route characteristics including an origin, destination, and transported object type, the routes representing actual transportations of transported objects of the transported object type from the origin to the destination within a time period. The computer system also may include a route selector configured to determine a route set from among the routes, based on additional route characteristics, and a route analyzer configured to determine a subset of routes from among the route set, based on a total transit time of each route within the route set, and configured to separate each of the subset of routes into route events of each route, each route event being associated with a route event completion time. The computer system also may include a route predictor configured to determine a predictive event completion time for each route event, based on the associated route event completion time, and further configured to use the predictive event completion time for each route event to compile a predictive route transit time and thereafter provide the predictive route transit time as a prediction for future transporting of transported objects of the transported object type between the origin and the destination.

According to another general aspect, a computer program product for forecasting routes for transporting objects may be tangibly embodied on a computer-readable medium and may include executable code that, when executed, is configured to cause a data processing apparatus to determine a route set from among routes of a route database, the routes being associated with a combination of route characteristics including an origin, destination, and transported object type, the routes representing actual transportations of transported objects of the transported object type from the origin to the destination within a time period, determine a subset of routes from among the route set, based on a total transit time of each route within the route set, separate each of the subset of routes into route events of each route, each route event being associated with a route event completion time, determine a predictive event completion time for each route event, based on the associated route event completion time, use the predictive event completion time for each route event to compile a predictive route transit time, and provide the predictive route transit time as a prediction for future transporting of transported objects of the transported object type between the origin and the destination.

According to another general aspect, an apparatus may include means for determining a route set from among routes of a route database, the routes being associated with a combination of route characteristics including an origin, destination, and transported object type, the routes representing actual transportations of transported objects of the transported object type from the origin to the destination within a time period, means for determining a subset of routes from among the route set, based on a total transit time of each route within the route set, means for separating each of the subset of routes into route events of each route, each route event being associated with a route event completion time, means for determining a predictive event completion time for each route event, based on the associated route event completion time, means for using the predictive event completion time for each route event to compile a predictive route transit time, and means for providing the predictive route transit time as a prediction for future transporting of transported objects of the transported object type between the origin and the destination.

The details of one or more implementations are set forth in the accompanying drawings and the description below. Other features will be apparent from the description and drawings, and from the claims.

DETAILED DESCRIPTION

Figure 1:
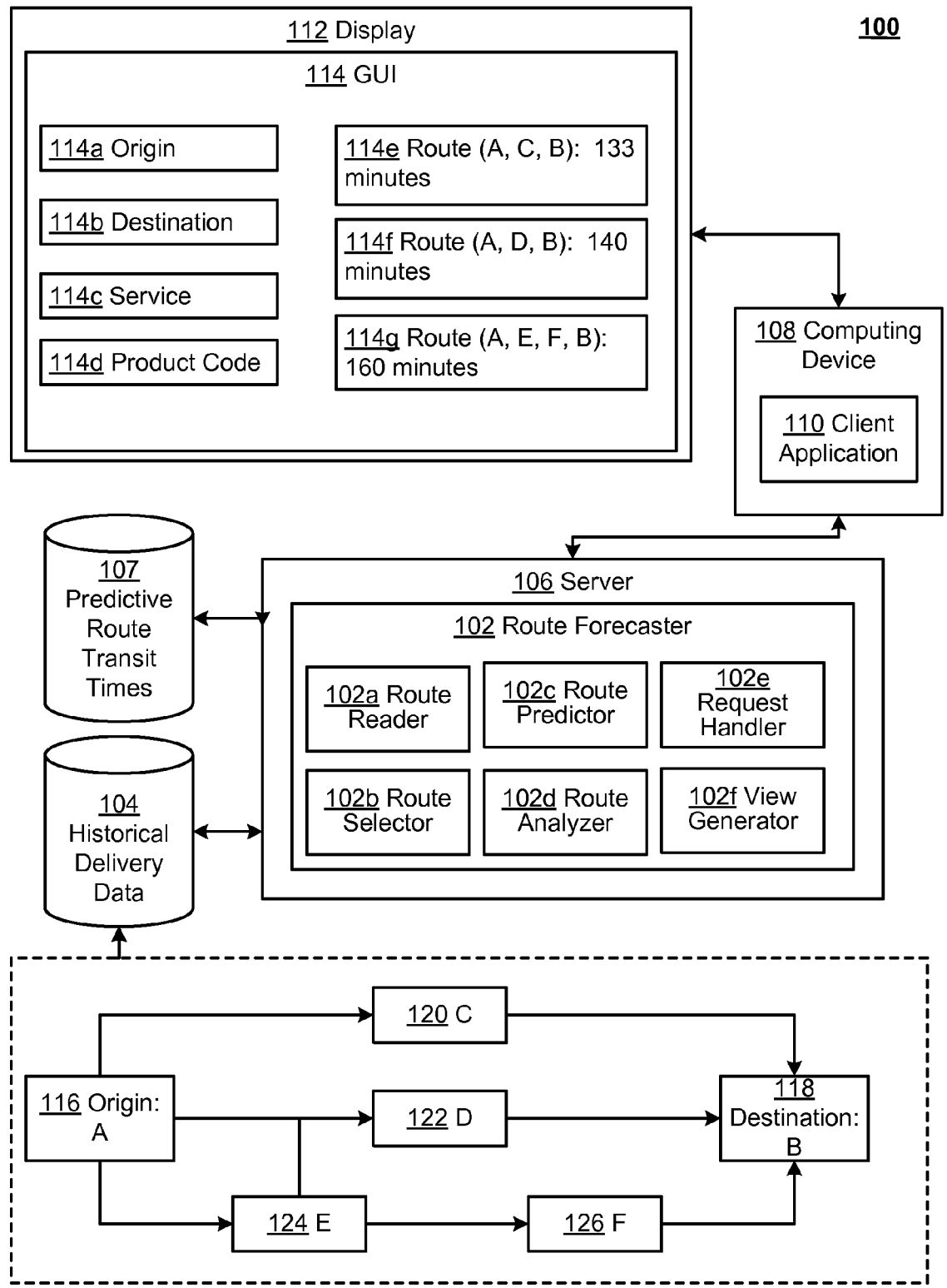
FIG. 1 is a block diagram of a system for forecasting route characteristics when transporting objects.

FIG. 1 is a block diagram of a system 100 for forecasting route characteristics when transporting objects, using historical transportation data in a way that allows fast processing of large volumes of such data while customizing the results to enhance an accuracy of the forecasting. In FIG. 1, a route forecaster 102 is illustrated that is configured to access an historical database 104 storing information regarding past shipments or other transportations of objects. The route forecaster 102 may execute in whole or in part on a server 106 or other suitable computing device, and may be used to predict an optimal transportation route(s). Such route predictions may be stored in a predictive route transit time database 107, and provided to a computing device 108 running a client application 110, so that a user (not explicitly shown in FIG. 1) may use a display 112 executing a graphical user interface (GUI) 114 to select a route having a high probability of meeting a desired transportation schedule. In this way, a shipment company or other enterprise engaged in transporting objects may increase their reliability in doing so with a desired timing.

In FIG. 1, example shipment routes are illustrated with respect to locations 116-126. Specifically, an origin "A" 116 and a destination "B" 118 are illustrated, along with intermediate or stop-off locations "C" 120, "D" 122, "E" 124, and "F" 126. Consequently, possible routes from origin 116 to destination 118 include route (A, C, B), route (A, D, B), route (A, E, F, B), and route (A, E, D, B). It may be appreciated that such routes are illustrated merely for the sake of example, and that in practice many more routes may exist, e.g., with different origin(s) and/or destination(s), and/or with more or fewer intermediate locations.

Further in FIG. 1, it is assumed that the illustrated routes are available for shipping a single type of transportation object, while, in reality, of course such networks may be used to transport many different types or combinations of transportation objects. In some examples, the (types of) transportation objects may include consumer products, or components for manufacturing consumer products. In other examples, the transported objects may include animals (e.g., pets), or may include people (such as when the relevant transportation include planes, trains or other modes for transporting people). Of course, these are but a few examples, and it will be appreciated that transportation objects referenced herein may refer to virtually any object that may be shipped, delivered, or otherwise transported.

As such, these transportation objects may relate to various restrictions or other rules regarding their transportation. For example, international transportations may relate to a need for passports, customs, or other border requirements. Similarly, transportation of animals may imply certain restrictions or requirements, such as a mandated quarantine of certain types of animals upon entry to a country. Some such restrictions may be represented by the use of a health code number (HCN).

Further transportation characteristics that may relate to the transportations described herein may include, for example, shipment services or categories. For example, as already referenced, a shipment or delivery company may provide various levels or types of services, such as express versus standard service, overnight delivery, or delivery with recipient signature required.

During all these and other types of transportations, movement of the transported objects and other aspects of the transportations may be recorded to the historical delivery data database 104. For example, a type of transported object (e.g., a particular consumer product) may be transported along a route from the origin A 116 to the intermediate location C 120 and then to the destination B 118. Along such a route, various route events may occur. For example, one route event may be the transit of the transported object from the origin A 116 to the intermediate location C 120, which may be associated with a transit time. At the intermediate location C 120, various additional route events may occur, including planned activities such as unloading, sorting, and reloading the transported object (e.g., transferring the transported object from a train to a truck). Each such route event, further examples of which are provided below, may be associated with a time (duration) necessary to accomplish the route event.

All such information may be recorded (e.g., using bar code scanners, RFID technology, or other techniques for monitoring and tracking the transported objects), and transmitted for storage within the historical delivery data 104. The data 104 also may include other relevant information, as described below. For example, there may be an expected transit time for the transportation of the transported object from the origin A 116 to the intermediate location C 120, which may be different from the actual transit time. Thus, if the actual transit time exceeds the expected transit time, then an exception may be recorded/stored in the historical delivery data 104. Other recorded information may include, e.g., various types of the information referenced above, such as that related to cross-border transportation requirements/restrictions, as well as information related to transportation costs (e.g., higher labor costs at the intermediate location 122 D as compared to those at the intermediate location C 120).

Thus, over a period of time, the historical delivery data 104 accumulates large amounts of data regarding actual transportations of objects over the available routes. For example, transportation data may be stored as a plurality of routes, so that the historical delivery data 104 may be considered a route database. For example, in a simplified case, such a route database may include routes, each identified by a unique identifier (ID), and organized by origin, destination, service (e.g., express versus standard), and total transit time over the route, all for a particular type of transportation object. Table 1 shows an example of data in such a route database:

TABLE 1

| Unique ID | Origin (zone) | Destination (zone) | Service/product | Total Transit time (in min.) |
|---|---|---|---|---|
| 1 | A | B | Express | *** |
| 2 | A | B | Express | *** |
| 3 | A | B | Express | *** |
| 4 | A | B | Express | *** |
| 5 | A | B | Express | *** |
| 6 | A | B | Express | *** |
| 7 | A | B | Express | *** |
| 8 | A | B | Express | *** |
| 9 | A | B | Express | 179 |
| 10 | A | B | Express | 142 |
| 11 | A | B | Express | 162 |
| 12 | A | B | Express | 127 |
| 13 | A | B | Express | *** |

As may be appreciated from the discussion herein (including examples provided below), Table 1 is a simplified example, and various other types of route information may be included. It may be appreciated that the historical delivery data 104, as a route database, may include data related to all of the routes illustrated in the example of FIG. 1, so that Table 1 may be considered for purposes of this example to represent a set or route set of the routes of the route database 104. In particular, the route set of Table 1 includes routes between origin A 116 and destination B 118 in which the relevant type of transportation object is shipped using an express service. Total transit time is shown as being included in Table 1, although for purposes of these examples, actual transit times are illustrated only for those routes discussed in more detail below in the following examples (e.g., routes 9-12).

Thus, the database 104 may include large amounts of route data for all available routes. As described herein, such data may be difficult to analyze and use in a manner that is suitably fast and reliable in predicting transportation times of future transportations. Nonetheless, the route forecaster 102 may use this data to generate such predictions for storage in the predictive route transit time database 107, in a manner that is fast and reliable, so that future transportation times may be quickly and accurately estimated.

Specifically, the route forecaster 102 may include a route reader 102a. The route reader 102a may be configured to determine routes from the route database 104, where the routes have shared route characteristics such as the same origin, destination, and transported object type. The routes may also include non-shared route characteristics for routes having the shared route characteristics, such as when two routes have the same origin, destination, and transported object type have non-shared intermediate locations (e.g., location C 120 as compared to location D 122). The route reader 102a, in example embodiments, may be configured to read routes from the route database 104 using more or fewer shared route characteristics. For example, intermediate locations and/or types of service may be included/required as shared route characteristics.

Once the route reader 102a reads the routes from the database 104, a route selector 102b may be used to select a set of routes therefrom. Routes in such a route set may have certain characteristics which make them more likely to be more valuable in predicting future route transit times, as described in detail below. For example, the route selector 102b may select a route set representing most-commonly used routes of the routes determined by the route reader 102a, or may select the route set by using those routes having the fewest or smallest exceptions, or may select the route set based on transit times of the routes (e.g., by eliminating routes with exceptionally small or large transit times as being non-representative). Further examples of selection of a route set by the route selector 102b are provided below. In general, Table 1 may be considered to provide a route set selected from routes of the route reader 102a by the route selector 102b.

A route analyzer 102d may be used to determine a subset of the route set, based on a total transit time of each route within the route set. For example, the route analyzer 102d may select routes for the route subset having total transit times which are closest to an average transit time of the route set (e.g., within a certain number/percentage of standard deviation(s) from the average transit time), or may select a subset of routes having transit times with a small standard deviation (indicating a high repeatability or low spread within a particular time period). An example of a route subset of the route set of Table 1 is shown in Table 2. In Table 2, additional route characteristics are illustrated as being included, including a unique service ID assigned to the route subset, and also a number of stop-off or intermediate locations associated with each route.

TABLE 2

| Unique ID | Unique Service ID | Origin (zone) | Destination (zone) | # Stop-off locations | Service/product | Total Transit time (in min.) |
|---|---|---|---|---|---|---|
| 9 | 1 | A | B | 1 | Express | 179 |
| 10 | 1 | A | B | 1 | Express | 142 |
| 11 | 1 | A | B | 1 | Express | 162 |
| 12 | 1 | A | B | 1 | Express | 127 |

The route analyzer 102d may be further configured to separate each of the routes of the route subset into route events of each route. That is, as described herein, route events may include transportations of the transported object between locations of the route, or may include planned activities that may occur at one or more locations, such as unloading, sorting, or (re)loading of the transported object(s). Table 3 provides an example of such route events.

TABLE 3

| Unique ID | Activity Sequence | Activity Type | Origin Location | Destination Location | Duration (in min.) |
|---|---|---|---|---|---|
| 9 | 1 | LOADING | A | A | 5 |
| 9 | 2 | TRANSPORT | A | C | 10 |
| 9 | 3 | UNLOADING | C | C | 3 |
| 9 | 4 | SORTING | C | C | 45 |
| 9 | 5 | LOADING | C | C | 6 |
| 9 | 5 | TRANSPORT | C | B | 30 |
| 9 | 7 | UNLOADING | B | B | 5 |
| 10 | 1 | LOADING | A | A | 4 |
| 10 | 2 | TRANSPORT | A | C | 33 |
| 10 | 3 | UNLOADING | C | C | 6 |
| 10 | 4 | SORTING | C | C | 60 |
| 10 | 5 | LOADING | C | C | 6 |
| 10 | 5 | TRANSPORT | C | B | 45 |
| 10 | 7 | UNLOADING | B | B | 6 |
| 11 | 1 | LOADING | A | A | 4 |
| 11 | 2 | TRANSPORT | A | C | 22 |
| 11 | 3 | UNLOADING | C | C | 4 |
| 11 | 4 | SORTING | C | C | 72 |
| 11 | 5 | LOADING | C | C | 4 |
| 11 | 5 | TRANSPORT | C | B | 25 |
| 11 | 7 | UNLOADING | B | B | 6 |
| 12 | 1 | LOADING | A | A | 3 |
| 12 | 2 | TRANSPORT | A | C | 32 |
| 12 | 3 | UNLOADING | C | C | 4 |
| 12 | 4 | SORTING | C | C | 67 |
| 12 | 5 | LOADING | C | C | 4 |
| 12 | 5 | TRANSPORT | C | B | 21 |
| 12 | 7 | UNLOADING | B | B | 4 |

As shown, Table 3 illustrates a sequence of transit times and planned activities for each route of the route subset. For example, for route with ID "9," Table 3 illustrates loading at location A (i.e., origin A 116), transporting from location A to location C (i.e., intermediate location C 120), unloading at location C, sorting at location C, loading at location C, transporting from location C to location B (i.e., destination B 118), and unloading at location B. Similar route events are shown for routes 10-12, and for each route event a route event completion time is illustrated (e.g., five minutes for loading at location A, ten minutes for transporting from location A to location C, and so on.

A route predictor 102c may use the route event completion times to determine a predictive event completion time. For example, Table 4 shows the same information as Table 3, but organized for the sake of illustration based on route events, so that it may be easily observed that route event completion times for the loading activity at location A for routes 9, 10, 11, 12 are, respectively, 5, 4, 4, and 3 minutes, as shown.

TABLE 4

| 9 | 1 | LOADING | A | A | 5 |
|---|---|---|---|---|---|
| 10 | 1 | LOADING | A | A | 4 |
| 11 | 1 | LOADING | A | A | 4 |
| 12 | 1 | LOADING | A | A | 3 |
| 9 | 5 | LOADING | C | C | 6 |
| 10 | 5 | LOADING | C | C | 6 |

TABLE 4-continued

| | | | | | |
|---|---|---|---|---|---|
| 11 | 5 | LOADING | C | C | 4 |
| 12 | 5 | LOADING | C | C | 4 |
| 9 | 4 | SORTING | C | C | 45 |
| 10 | 4 | SORTING | C | C | 60 |
| 11 | 4 | SORTING | C | C | 72 |
| 12 | 4 | SORTING | C | C | 67 |
| 9 | 2 | TRANSPORT | A | C | 10 |
| 10 | 2 | TRANSPORT | A | C | 33 |
| 11 | 2 | TRANSPORT | A | C | 22 |
| 12 | 2 | TRANSPORT | A | C | 32 |
| 9 | 5 | TRANSPORT | C | B | 30 |
| 10 | 5 | TRANSPORT | C | B | 45 |
| 11 | 5 | TRANSPORT | C | B | 25 |
| 12 | 5 | TRANSPORT | C | B | 21 |
| 9 | 7 | UNLOADING | B | B | 5 |
| 10 | 7 | UNLOADING | B | B | 6 |
| 11 | 7 | UNLOADING | B | B | 6 |
| 12 | 7 | UNLOADING | B | B | 4 |
| 9 | 3 | UNLOADING | C | C | 3 |
| 10 | 3 | UNLOADING | C | C | 6 |
| 11 | 3 | UNLOADING | C | C | 4 |
| 12 | 3 | UNLOADING | C | C | 4 |

The route predictor 102c may thus determine a predictive event completion time for each route event. For example, an average route event completion time for each route event may be calculated, which in the example of the loading activity at location A would result in an average or predictive time of 4 minutes. Similar calculations may be performed for each set of route events, resulting in average times of, respectively, 5 minutes, 60 minutes, 24 minutes, 30 minutes, 5 minutes, and 5 minutes.

These predictive event completion times may then be compiled into a composite route completion time, which, in the present example, is 133 minutes. This predictive time may be saved in the historical delivery data database 104 or in another appropriate memory, and may be made available by the server 106 in various manners, as described in detail, herein.

It may be appreciated that there may be many different ways to store and/or manipulate the historical delivery data related to Tables 1-4. For example, the data of Tables 1-4 may be stored in a single or in multiple tables. For example, it may occur that a first table may include each route with a unique ID and including the origin/destination information, stop-off/intermediate locations, service and product information, and total transit times. A second table may be constructed that includes the activity sequence and activity type of Table 3, as well as duration or completion times for route events such as transit times and planned activities, and locations for these route events, as needed. Then, the unique ID may serve as the link between these tables (e.g., the unique ID may represent a shipment or freight unit or some other identifier included with each transportation/shipment). Data of Tables 3-4 may be constructed to include necessary data for the calculations described herein, e.g., may include routes and route characteristics matching the original route characteristics specified for the route reader 102a, and may assign the unique service ID to these. This information may be stored in a cache or other temporary and easily-accessible memory location. A parameter may be set to determine how many such routes are filled in such a cache to be used for determining the predictive route transit times for database 107.

In practice, the route forecaster 102 may be scheduled to analyze the database 104 on a periodic basis, and to construct route predictions for every available route having pre-defined route characteristics (e.g., for every combination of origin/destination/object type, and/or other route characteristics such as type of service or number of intermediate locations). Then, the results of these periodic predictions may be made available over a network, e.g., as a web service. Clients, such as the computing device 108 and client application 110, may thus have access to such automatically updated predictions on an as-needed basis.

Such clients may choose to access this information in a variety of ways. For example, a client shipping company may routinely ship between the origin A 116 and the destination B 118. On a given day, the client application (e.g., a transportation management program) may thus access or otherwise receive the relevant predictive route transit time(s) for one or more routes between origin A 116 and destination B 118, and may then distribute the predicted optimal route to a driver(s) or other personnel in charge of shipping.

For example, on a given day it may occur that the route (A, C, B) is predicted to take 133 minutes, as in the example above, while the route (A, D, B) may be predicted to take 140 minutes, so that the client application 110 may select the route (A, C, B). Over the next week (or other designated time period) it may occur that various delays become associated with the route (A, C, B). For example, there may be construction or other transportation delays between the origin A 116 and the intermediate location C 120, or there may be a shortage of labor at the intermediate location C 120 that results in slower loading or unloading. If the historical delivery data 104 and the processing thereof by the route forecaster 102 occurs periodically, e.g., every day or every week, then the slower transit times along route (A, C, B) will be reflected in the predictive route transit time, resulting in a new predicted transit time of, e.g., 145 minutes. Consequently, the route forecaster 102 will begin to output the route (A, D, B) as the preferred route (assuming a constant transit time of 140 minutes for that route). Thus, it may be seen that the system 100 provides dynamic, updated route predictions that allow a shipper or other client to make accurate and reliable predictions regarding route transit times, where such predictions are constantly reflective of recent or otherwise important route information that may affect future route transit times.

In the example of FIG. 1, as already referenced, the computing device 110, in conjunction with the client application 110, may use a display 112 to provide the GUI 114. It may be appreciated that the computing device 108 may be virtually any feasible computing device, such as a laptop, personal digital assistant, or other personal or handheld computer, or a computing device selected from a number of known computing devices used by shipping and other transportation companies to track and assign delivery routes. Similarly, the display 112 may reflect virtually any display, such as a discrete monitor or integrated viewscreen. The GUI 114 may represent a conventional browser used to access the server 106 over a private or public network, or may represent a customized GUI developed by a user to be compatible with the client application 110. Thus, the illustrated screens 114a-114g may be merely representative of many different fields and elements that might be included in the GUI 114, and it will be appreciated that other elements, such as conventional GUI elements and/or non-conventional GUI elements designed to implement inventive functions described herein. Similarly, elements of the GUI 114, whether explicitly illustrated or not, may be integrated into existing user interface(s) of the client application 110 of a user of the route forecaster 102.

For purposes of specific examples in explaining operations of the system 100 of FIG. 1, the GUI 114 is illustrated as including a field 114a for specifying an origin, and a field 114b for specifying a destination. A field 114c provides for specification of a service (e.g., express or standard delivery options), while a field 114d allows for input of a product code identifying a type of transportation object being transported.

Thus, in the example of FIG. 1, these fields 114a-114d allow for a user to specify route characteristics for determining a predictive route transit time for a route having the specified route characteristics. The fields 114a-114d, of course, may use any conventional techniques for specifying the desired information, such as drop-down menus or text entry fields.

In practice, then, a user may use the GUI 114 to specify some or all of the route characteristics of fields 114a-114d, or other route characteristics, as described herein or as would be apparent. Then, a request handler 102e of the route forecaster 102 may receive the specified route characteristics and access available predictive route transit times which match those route characteristics. Subsequently, a view generator 102f may output predictive information for one or more routes and route transit times. Specifically, as shown in FIG. 1, fields 114e-114g may be used to output the resulting routes.

In FIG. 1, as described, predictive route transit times may be calculated periodically by the elements 102a-102d. Consequently, it may be appreciated that in practice the request handler 102e may simply need to access the relevant data to provide the predictive route transit times. In other example implementations, however, some or all of the predictive route transit times may be calculated in real time or near-real time (e.g., the request handler 102e may initiate operation of the elements 102a-102d to obtain current information regarding the predictive route transit times).

In FIG. 1, three routes (i.e., routes with predicted route times) are provided, using elements 114e-114g. This may be, for example, to allow a user to select from among these routes on factors other than the predicted transit times. Such factors may include, for example, human preference for one route over another, or some other knowledge or information that may imply selection of a route that is the best route despite not having the lowest predictive route transit time.

As referenced above, and described in more detail herein, the information in the predictive route transit times database 107 may be made available via web service. For purposes of FIG. 1, the route reader 102a and/or the route predictor 102c may be considered to be configured to implement such a web service, perhaps in conjunction with other components, not all of which are necessarily shown in FIG. 1 but which would be apparent to one of ordinary skill in the art (for example, components associated with publishing the web service to a directory of web services, or associated with interfacing with other applications or services). Thus, the route reader 102a may periodically read the predictive route transit times from the database 107 and the route predictor 102c may publish these to subscribing or otherwise-requesting applications (including the client application 110 related to the GUI 114).

Figure 2:
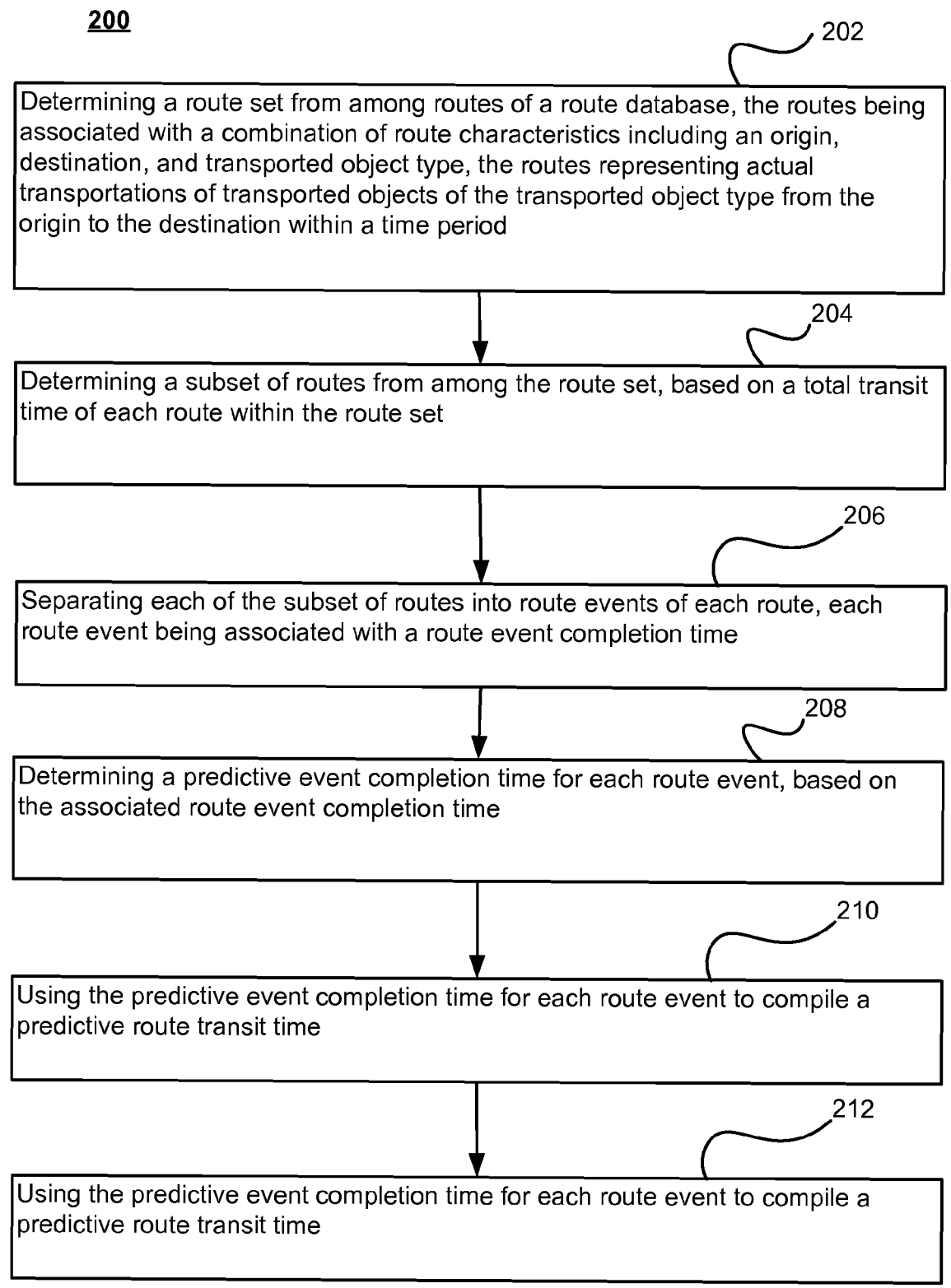
FIG. 2 is a first flowchart illustrating example operations of the system of FIG. 1.

FIG. 2 is a first flowchart 200 illustrating example operations of the system of FIG. 1. It may be appreciated with respect to FIG. 2 that although the operations of the flowchart 200 are illustrated as discrete, linear operations, in practice it may occur that an order of some of the operations may be altered, or that the operations may overlap in time or in function, or that two or more of the operations may be collapsed into a single operation. Similar comments apply to the flowcharts 300 and 400 of FIGS. 3 and 4, respectively.

In FIG. 2, a route set may be determined from among routes of a route database, the routes being associated with a combination of route characteristics including an origin, destination, and transported object type, the routes representing actual transportations of transported objects of the transported object type from the origin to the destination within a time period (202). For example, the route reader 102a may be configured to read all routes having such route characteristics from the route (historical delivery data) database 104, either periodically and/or based on a request received from the GUI 114. Then the route selector 102b may be configured to determine the route set, where specific techniques for determining the route set are referenced above and discussed in more detail below with reference to FIG. 3.

A subset of routes from among the route set may be determined, based on a total transit time of each route within the route set (204). For example, the route analyzer 112d may be configured to use an average route transit time (and associated standard deviation) from routes of the route set to determine the route subset. Again, further details and examples of such operations are provided below with respect to FIG. 3.

Each of the subset of routes may be separated into route events of each route, each route event being associated with a route event completion time (206). For example, the route analyzer 102c may be configured to separate the route subset into such route events, as described above with respect to Tables 3 and 4.

A predictive event completion time may be determined for each route event, based on the associated route event completion time (208). For example, the route predictor 102c may determine such predictive event completion times, such as a prediction of four minutes for loading at location (origin) A in the example of Tables 3 and 4 above. In those examples, the predictive event completion time is determined as average of the route event completion times, and additional or alternative examples of techniques for determining the predictive event completion time are provided below with respect to FIG. 3.

The predictive event completion time for each route event may be used to compile a predictive route transit time (210). For example, the route predictor 102c may simply add the predictive route event completion times to arrive at the predictive route transit time(s).

The predictive route transit time may be provided as a prediction for future transporting of transported objects of the transported object type between the origin and the destination (212). For example, the route predictor 102c and/or the view generator 102f may be configured to output the predictive route transit time, as part of a web service and/or in conjunction with the GUI 114, as described herein.

Figure 3:
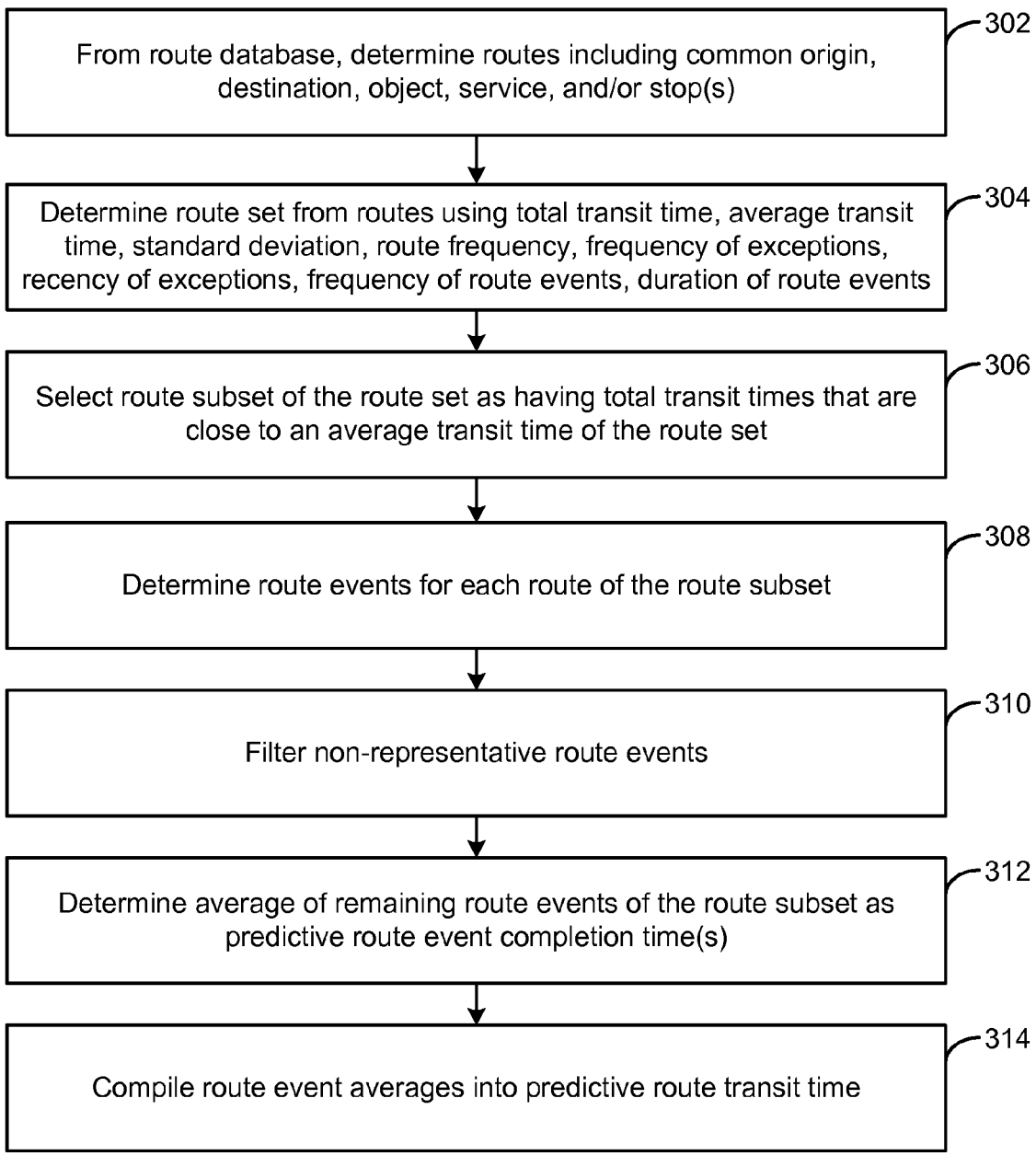
FIG. 3 is a second flowchart illustrating example operations of the system of FIG. 1.

FIG. 3 is a second flowchart 300 illustrating example operations of the system of FIG. 1. Specifically, FIG. 3 provides more detailed (but still non-limiting) example(s) of operations of FIG. 2.

In FIG. 3, routes may be determined from a route database including common origin, destination, object, service, and/or stop(s) (302). That is, the route reader 102a may be programmed to more or less inclusive in terms of what route characteristics are specified to obtain initial routes. The thus-determined routes may thus represent a relatively large volume of route data to work with in determining the predictive route transit times.

A route set may be determined from the routes (304), using one or more of a number of possible route characteristics. For example, in a simple case the route selector 102b may simply select the most common or must-used routes from among the determined routes. For example, it may occur that within the past two weeks (or other specified time period), the route (A, C, B) was used 50 times, while the route (A, D, B) was used 30 times, and the route (A, E, F, B) was used 10 times, and the route (A, E, D, B) was used 2 times. In this case, the frequency of use of the route (A, C, B) may be a factor in including that route within the route set.

This factor may be useful, for example, inasmuch as it implicitly includes or reflects previous choices made to select the route (A, C, B), which may be presumed to have been made for valid reasons (e.g., driver knowledge of or preference for that route). On the other hand, there are many situations which may illustrate why route frequency may not be sufficient to include a route within the route set. For example, of the 50 times route (A, C, B) was used, perhaps 40 of these were used early in the two week period, reflective of this route becoming non-preferred during the relevant time period, e.g., when compared to the route (A, D, B) which may have been used 25 of the 30 times relatively later (i.e., more recently) in the relevant time period.

In other examples, it may occur that there is a small and perhaps insignificant difference between a frequency of use of two otherwise-similar routes. For example, additionally, or alternatively, it may occur that two routes may have a large or small difference in frequency of use, yet may be very similar in total transit time. In such cases, it may be unwise to eliminate one of the routes from the route set merely because it was not used quite as frequently as the other route.

Thus, the route selector 102b may consider a total transit time of each possible route to be included in the route time, as well as an average transit time for groups of routes having certain shared route characteristics. In this regard, a standard deviation calculation may be used to differentiate between the routes to be included (or not included) in the route subset. For example, it may occur that the route (A, C, B) may be the most-frequently used route, and may have the lowest average transit time of any available route sharing the specified route characteristics. Nonetheless, it may occur that another route, e.g., the route (A, D, B), although used less frequently and having a higher average transit time, may have a very low standard deviation, indicative of a high repeatability and low dispersion of transit times along that route.

Consequently, the route (A, D, B) may or may not be preferred for inclusion in the route set in these circumstances. For example, if route forecasting is being done for an overnight delivery service, and an average transit time of the route (A, C, B) is well-within the margin of error for completing the overnight delivery, then a higher standard deviation may be tolerated, since even if the transit time varies widely the overnight delivery objective is still highly likely to be accomplished. On the other hand, if the route (A, C, B) has an average transit time that is already closer to the margin of error for overnight delivery, then the route (A, D, B) may become preferred as taking somewhat longer on average, yet being more likely on the whole to meet the goal of overnight delivery. In practice, then, a different weighting may be assigned to the inclusion of the standard deviation calculation, depending, e.g., on a proximity of the average transit time for the relevant route to a cut-off time or margin of error for accomplishing a delivery goal.

Another class of criteria for determining the route set relates to exceptions in the transportation process(es). For example, as referenced above, the route database 104 may include expected values for, e.g., time of completion of each route and/or individual route event. Then, e.g., when an actual time of completion is greater than an expected time, an exception may be recorded. The exception may be binary, and just recorded as such every time the exception occurs (or doesn't occur); in other examples, however, exceptions may be recorded as amounts over the expected values, or as amounts within various ranges outside of the expected values (e.g., slightly over or greatly over an expected completion time).

When considering route data from within a specified recent time period, such exceptions may be used in a variety of ways to assist in the route forecasting process (e.g., in determining the route set). For example, very recent exceptions may be weighted more heavily as compared to less recent ones. Additionally, more frequent exceptions may be weighted more heavily than less frequent ones. Further, and similarly, more egregious exceptions may be weighted relatively heavily (assuming such data is available).

The description above with respect to total transit times may in many cases be applied similarly at a level of individual route events. For example, average times for route events may be considered, along with standard deviation(s) associated therewith.

In general, it may be appreciated that the operations of the route reader 102a are designed in example embodiments to provide a high-level or coarse selection of routes from the route database, the routes sharing a small and thereby inclusive set of route characteristics. Somewhat similarly, the route selector 102b is designed to narrow the routes into the set of routes in a manner that is generally inclusive and that is thereby likely to contain the optimal route(s) that are ultimately to serve as the bases for obtaining the predictive route transit times. Consequently, it may be appreciated that not all of the factors just described for selecting the route set may be used or needed, and, instead, some of these may later be applied by the route analyzer 102d and/or the route predictor 102c when determining the route subset and/or the predictive route transit times, respectively, as referenced below.

A route subset of the route set may be selected as having total transit times that are close to an average transit time of the route set (306). For example, the route analyzer 102c may consider total transit times of the route set to determine an average route transit time, and then may select all routes having transit times within a certain number of standard deviations thereof (e.g., within 0.5 std). Thus, such a calculation may be contrasted to the use of standard deviation by the route selector 102b; there, standard deviation is used to select a physical route(s) from among a plurality of possible routes (e.g., to select the route (A, C, B) from among all available routes between origin A 116 and destination B 118). In the present context, the physical route(s) has been selected, and the standard deviation is used to select representative transit times (e.g., to filter or omit non-representative transit times that are outside an acceptable range from the determined average transit time).

As referenced above, the various selection criteria discussed above for selecting the route set may be applied additionally or alternatively when determining the route subset. For example, the route set may be determined based on total transit time, route use frequency, and lowest standard deviation(s) values. Then, the route subset may be determined from the route set using the total transit times thereof including the average transit time and associated standard deviations, as just described, and also based on consideration of recorded exceptions within the route set as already described above (e.g., providing greater or lesser weighting based on a frequency, recency, or extent of the exception(s)).

Somewhat similarly, on-time probabilities may be calculated for each route and/or route event (e.g., a probability that a shipment will be on time within a range of −y to +y), and selection of routes for the route set and/or route subset may be made accordingly. Probability of exception also may be tracked over time, so that an increasing probability may be indicative of a potential problem with a given route and may thus make that route less likely to be included within the route set or route subset.

Next in FIG. 3, route events may be determined for each route of the route subset (308), e.g., as shown above in Tables 3 and 4. Such route events may include transit times between locations of the route(s), as well as planned activities (e.g., loading, sorting, unloading) that may occur at each route location.

Non-representative route events may be filtered or otherwise removed from the route events (310). For example, in Table 4, above, if the route completion times for the route event (activity type) "loading" included times 5, 4, 4, and 12, then the 12 minute time may be omitted from further calculations as an outlier that is not representative of completion times for that route event. Filtering out such non-representative times may be accomplished in a number of ways. For example, times that are outside of a certain percentage or number of standard deviations from an average may be omitted.

An average of remaining route events of the route subset may be determined as predictive route event completion time (312), such as described above with respect to Table 4. Then, route event averages may be compiled into predictive route transit time(s) (314), such as in the example of Table 4 in which the compilation occurred as a simple addition of each of the route event completion times.

As described, multiple predictive route transit times may be determined for different possible routes between a given origin and destination, or a single (best) predictive route transit time may be provided. These predictive rout transit times may be updated periodically or at user request, in order to reflect recent route conditions or changes.

Thus, it may be appreciated from the above description that elements of the route forecaster 102 may be configured to execute certain algorithms to perform their respective functions. For example, the route selector 102b may input routes from the route reader and apply an equation(s) which weights some or all of the various factors mentioned above, or other factors, according to an importance assigned by a designer or administrator of the route forecaster 102. For example, as already referenced, the route selector 102b may input data regarding all route exceptions, yet may weight frequent exceptions or very recent exceptions more heavily when selecting the route set. Similar comments apply with respect to other ones of the factors mentioned above, and also similarly with respect to algorithms executed by the route analyzer 102d and the route predictor 102c in calculating the route subsets, predictive route event completion times, and predictive route transit times.

Figure 4:
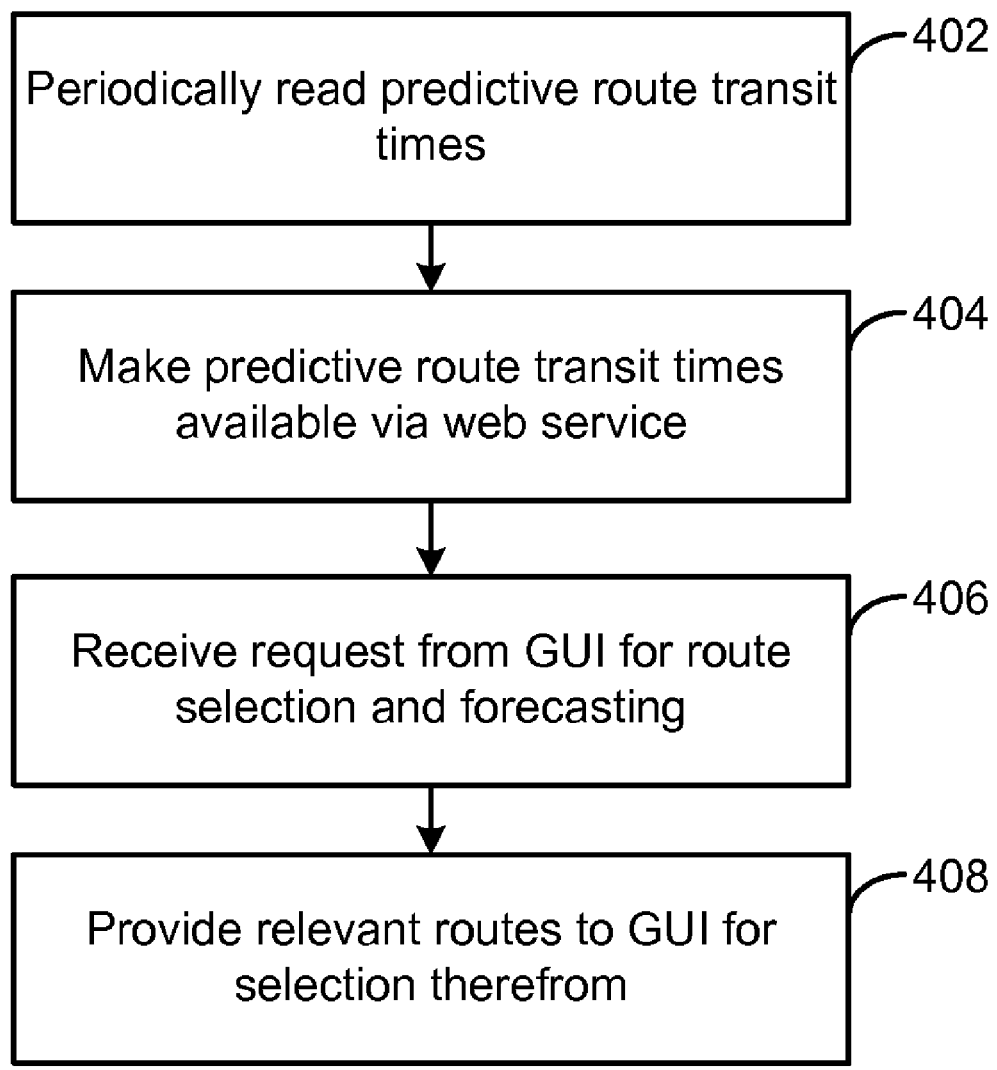
FIG. 4 is a third flowchart illustrating example operations of the system of FIG. 1.

FIG. 4 is a third flowchart 400 illustrating example operations of the system of FIG. 1. FIG. 4 is representative of example operations that may occur once the predictive route transit times have been determined.

In FIG. 4, predictive route transit times may periodically be read (402), e.g., by the route reader 102a, from the predictive route transit times database 107. As referenced above, the route reader 102a and/or the route predictor 102c may include or be associated with a web service configured to obtain the predictive route transit times, and thereafter to make the predictive route transit times available via web service (404). For example, the route reader 102a may engage in a 'push' operation to provide relevant predictive route transit times to subscribing users who are interested in those times.

In the example of FIG. 4, a request from the GUI 114 for route selection and forecasting may be received (406), e.g., by way of the request handler 102e. For example, fields 114a-114d may be used to specify a desired predictive route transit time. Then, relevant routes may be provided to the GUI 114 for selection therefrom (408), e.g., using fields 114e-114g and the view generator 102f.

Of course, FIG. 4 is merely an example, and other additional or alternative operations are possible. For example, there may be a combined use of the describe web service and the GUI 114, such as when the web service periodically provides predictive route transit times for most-commonly used routes, but the user also has the option of specifying other routes for forecasting with respect thereto, using the GUI 114.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system comprising:
   one or more processors;
   one or more computer-readable storage media storing computer instructions translatable by the one or more processors;
   a route reader configured to determine routes of a route database for transportation of objects by shipping transport, the routes being associated with a combination of route characteristics including an origin, destination, and transported object type, the routes representing actual transportations by shipping transport of the transported objects of the transported object type from the origin to the destination within a time period;
   a route selector configured to determine a route set from among the routes, based on additional route characteristics;
   a route analyzer configured to determine a subset of routes from among the route set, based on a total transit time of each route within the route set, and configured to separate each of the subset of routes into route events of each route, the route events including at least loading, transporting, and unloading the objects, and each route event being associated with a route event completion time; and
   a route predictor configured to determine a predictive event completion time for each route event, based on the associated route event completion time, and further configured to use the predictive event completion time for each route event to compile a predictive route transit time and thereafter provide the predictive route transit time as a prediction for future transporting by shipping transport of the transported objects of the transported object type between the origin and the destination.

2. The computer system of claim 1 wherein the route characteristics include at least one of a service type of the transportation and a number of intermediate locations including in each route between the origin and the destination.

3. The computer system of claim 1 wherein the additional route characteristics include at least one of a total transit time of each of the routes, an average total transit time of each of the routes, a standard deviation associated with each route of the routes, a frequency of use of each of the routes within the time period, a frequency of exceptions within each of the routes, a recency of exceptions within each of the routes, and a duration of route events within each of the routes.

4. The computer system of claim 1 wherein the route selector is configured to use a combination of the additional route characteristics in which a weighting is applied to at least one of the additional route characteristics to reflect a relative importance thereof in obtaining the predictive route transit time.

5. The computer system of claim 1 wherein the route analyzer is configured to determine the subset of routes by selecting the subset as being within a multiple of a standard deviation of the average total transit time of routes of the route set.

6. The computer system of claim 1 wherein the route analyzer is configured to determine the subset of routes based on one or more of an average total transit time of each route of the set of routes, a standard deviation associated with each route of the set of routes, a frequency of exceptions within each route of the set of routes, a recency of exceptions within each route of the set of routes, and a duration of route events within each route of the set of routes.

7. The computer system of claim 1 wherein the route events include one or more of a transit time between each stop of each route and planned activities that occur at each stop of each route.

8. The computer system of claim 1 wherein the route predictor is configured to determine the predictive event completion time based on an average route event completion time of each associated route event within each route of the subset of routes.

9. The computer system of claim 1 wherein the time period comprises a plurality of time periods and wherein the predictive route transit time is periodically calculated based on a most recent one of the time periods, and is stored in a predictive route transit time database to be provided therefrom using a web service.

10. The computer system of claim 1 comprising:
    a request handler configured to receive a request for the predictive route transit time as received from a graphical user interface (GUI); and
    a view generator configured to provide the predictive route transit time using the GUI.

11. A computer program product for forecasting routes for transporting objects, the computer program product being tangibly embodied on a computer-readable medium and including executable code that, when executed, is configured to cause a data processing apparatus to:
    determine a route set from among routes of a route database for transportation of objects by shipping transport, the routes being associated with a combination of route characteristics including an origin, destination, and transported object type, the routes representing actual transportations by shipping transport of the transported objects of the transported object type from the origin to the destination within a time period;
    determine a subset of routes from among the route set, based on a total transit time of each route within the route set;
    separate each of the subset of routes into route events of each route, the route events including at least loading, transporting, and unloading the objects, and each route event being associated with a route event completion time;
    determine a predictive event completion time for each route event, based on the associated route event completion time;
    use the predictive event completion time for each route event to compile a predictive route transit time; and
    provide the predictive route transit time as a prediction for future transporting by shipping transport of the transported objects of the transported object type between the origin and the destination.

12. The computer program product of claim 11 wherein the executable code is configured to cause the data processing apparatus to use a combination of the additional route characteristics in which a weighting is applied to at least one of the additional route characteristics to reflect a relative importance thereof in obtaining the predictive route transit time.

13. The computer program product of claim 11 wherein the executable code is configured to cause the data processing apparatus to determine the set of routes based on a standard deviation of total transit times of each physical route of the routes, and based on a frequency of use of each physical route of the routes, within the time period.

14. The computer program product of claim 11 wherein the executable code is configured to cause the data processing apparatus to determine the subset of routes by selecting the subset as being within a multiple of a standard deviation of the average total transit time of routes of the route set.

15. The computer program product of claim 11 wherein the additional route characteristics include at least one of a total transit time of each of the routes, an average total transit time of each of the routes, a standard deviation associated with each route of the routes, a frequency of use of each of the routes within the time period, a frequency of exceptions within each of the routes, a recency of exceptions within each of the routes, and a duration of route events within each of the routes.

16. The computer program product of claim 11 wherein the executable code is configured to cause the data processing apparatus to determine the predictive event completion time based on an average route event completion time of each associated route event within each route of the subset of routes.

17. The computer program product of claim 11 wherein the predictive route transit time is periodically calculated based on a most recent one of the time period, and is stored in a predictive route transit time database to be provided therefrom using a web service.

18. The computer program product of claim 11 wherein the executable code is configured to cause the data processing apparatus to receive a request for the predictive route transit time as received from a graphical user interface (GUI), and provide the predictive route transit time using the GUI.

19. A method comprising:
  determining, at a server, a route set from among routes of a route database for transportation of objects by shipping transport, the routes being associated with a combination of route characteristics including an origin, destination, and transported object type, the routes representing actual transportations by shipping transport of the transported objects of the transported object type from the origin to the destination within a time period;
  determining a subset of routes from among the route set, based on a total transit time of each route within the route set;
  separating each of the subset of routes into route events of each route, the route events including at least loading, transporting, and unloading the objects, and each route event being associated with a route event completion time;
  determining a predictive event completion time for each route event, based on the associated route event completion time;
  using the predictive event completion time for each route event to compile a predictive route transit time; and
  providing the predictive route transit time as a prediction for future transporting by shipping transport of the transported objects of the transported object type between the origin and the destination.

20. The method of claim 19 wherein the providing the predictive route transit time comprises providing the predictive route transit time using one or both of a web service and a graphical user interface (GUI).

* * * * *